M. H. KORN.
SANDING DEVICE FOR SELF PROPELLED ROAD VEHICLES.
APPLICATION FILED DEC. 2, 1913.
1,090,921.  Patented Mar. 24, 1914.
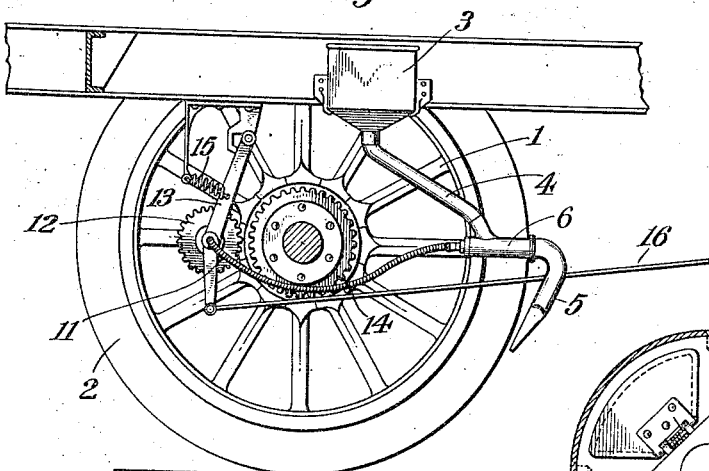
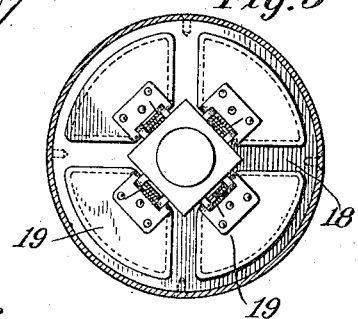
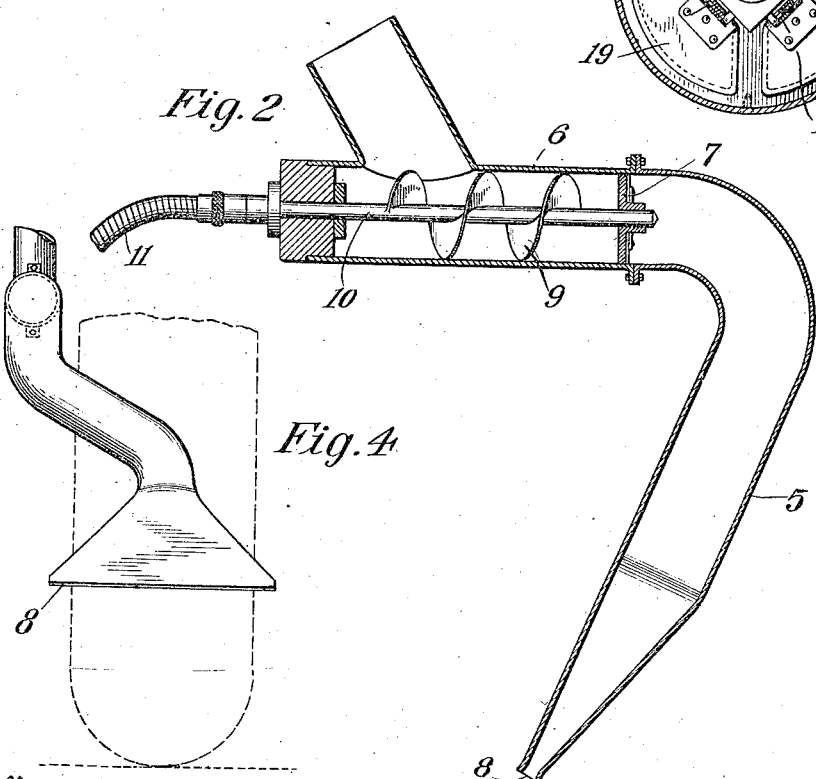

UNITED STATES PATENT OFFICE.

MAX H. KORN, OF HACKENSACK, NEW JERSEY.

SANDING DEVICE FOR SELF-PROPELLED ROAD-VEHICLES.

1,090,921.  Specification of Letters Patent.  Patented Mar. 24, 1914.

Application filed December 2, 1913. Serial No. 804,232.

*To all whom it may concern:*

Be it known that I, MAX H. KORN, a citizen of the United States, residing in Hackensack, county of Bergen, State of New Jersey, have invented or discovered certain new and useful Improvements in Sanding Devices for Self-Propelled Road-Vehicles, of which the following is a full, clear, and complete disclosure.

My invention particularly relates to an arrangement for preventing the slipping and skidding of the wheels of self propelled road vehicles when moving over wet and slippery surfaces. With road vehicles this slipping and skidding may be of three kinds; (1) the continued motion of the vehicle in the line of its previous motion when the brakes are applied; (2) the slipping of the driving wheels on the road surface on applying power for the purpose of starting or accelerating the vehicle; (3) side slipping or motion in a direction at an angle to the intended direction of motion. The third kind is peculiar to road vehicles and is the cause of many serious accidents.

It is the object of my invention to overcome these several kinds of slipping and skidding by incorporating in the vehicle mechanism under the control of the operator for applying sand or friction material to the road surface and in the drawing accompanying and forming a part of this specification I have illustrated the preferred embodiment of my invention and it will readily be understood by an explanation of this embodiment.

In the drawing Figure 1 is a side elevation of a rear wheel and the adjacent parts of a self propelled vehicle with my improved arrangement applied thereto. Fig. 2 is a sectional view of the distributing spout and the ejector for forcing out the friction material. Fig. 3 is a detail view of the gate employed to normally close the discharge conduit when the apparatus is out of use, and Fig. 4 is a detail view showing the relative size and location of the spout with respect to the tread of the wheel.

Referring in detail to the several views, the numeral 1 designates the driving wheel which is provided with a tire 2 having a tread of any usual shape.

The numeral 3 designates a reservoir for sand or friction material mounted on the chassis 4 of the vehicle. A conduit 4 extends from the reservoir to the distributing spout 5 and a gate 7 is disposed in the horizontal portion 6 of this conduit. In practice this gate 7 is preferably located immediately adjacent the spout and as near the discharge orifice 8 of the spout as possible, in order that when the gate opens and the delivery of material starts the material will reach the surface in as short a time as possible. An endless screw ejector 9 is mounted in the discharge conduit immediately in the rear of the gate and the shaft 10 of this ejector is connected by a flexible driving cable 11 with the spur gear 12. The latter is mounted on a rocker arm 13 and is normally held away from the gear 14 on the wheel by the spring 15. In order to throw the gears 12 and 14 into mesh a rod 16 is provided and extends to a pedal or operating handle not shown, under the control of the operator. The gate 7 above referred to is preferably of the spring pressed type and as shown consists of a skeleton frame 18 and four spring pressed flaps 19 arranged to normally close the discharge conduit but to open outwardly under the pressure of the material when the ejector is brought into action. The discharge orifice 8 is narrow and elongated and extends not only across the front of the tread but projects on each side so as to distribute a broad band of material sufficient in width to overcome slipping and skidding sidewise as well as in other directions. In this respect the spout differs from those heretofore used on rail vehicles which are purposely made narrow so as to limit the delivery of material to a narrow layer on the rail and under the tread. By locating the gate at or near the spout and by providing a power driven ejector located immediately in the rear of the gate I am able to secure a much quicker action than would be possible in any arrangement where the gate is located at or adjacent the reservoir and the discharge depends on gravity alone.

While the structure illustrated shows the improvements applied to only one wheel, it is obvious that it may be applied to all four wheels and in such case, if desired, a single reservoir may be employed. Where the invention is employed in connection with front or steering wheels arranged to turn with respect to the body, the spout should be mounted so as to turn with the wheels and this can be easily accomplished in any desired way, as by mounting it on the steering knuckle.

When this is done the conduit 4 should be made of flexible material.

It is believed that the operation of my improved arrangement will readily be understood from the foregoing description and while I have only described the preferred embodiment of my invention, I am aware that modifications may be made therein by those skilled in the art without departing from the scope of my claim.

What I claim is:

The combination in a self propelled road vehicle of a wheel, a reservoir of friction material mounted on the vehicle, a discharge conduit extending therefrom and terminating in a discharge spout disposed in advance of said wheel, a spring pressed gate in said conduit at its discharge end, an ejector disposed in said conduit in the rear of said gate and driving mechanism for said ejector comprising a gear on said wheel arranged to mesh with a gear connected to said ejector and means for connecting and disconnecting said driving mechanism, substantially as described.

MAX H. KORN.

Witnesses:
RAMSAY HOGUET,
WALTER S. JONES.